United States Patent [19]

Jahnle

[11] 4,147,486

[45] Apr. 3, 1979

[54] MECHANICAL PRESS FOR MOLDING PLASTIC PARTS

[75] Inventor: Herbert A. Jahnle, Havertown, Pa.

[73] Assignee: The Budd Company, Troy, Mich.

[21] Appl. No.: 903,749

[22] Filed: May 8, 1978

[51] Int. Cl.² .................. B30B 1/32; B30B 11/04; B30B 15/16; B29C 17/00

[52] U.S. Cl. .................. 425/157; 425/156; 425/160; 425/451.2; 425/590; 425/383; 425/394

[58] Field of Search ........... 425/156, 157, 160, 158, 425/159, 78, 450.1, 451.2, 451.9, 589, 590, 595

[56] References Cited

U.S. PATENT DOCUMENTS

| | | | |
|---|---|---|---|
| 2,434,849 | 1/1948 | Hess | 425/160 X |
| 2,671,246 | 3/1954 | Lester | 425/157 |
| 2,710,988 | 6/1955 | Willcox et al. | 425/156 |
| 2,718,662 | 9/1955 | Bohonnon et al. | 425/78 |
| 2,738,550 | 3/1956 | Groves | 425/78 |
| 2,739,349 | 3/1956 | Strauss | 425/156 |
| 2,831,212 | 4/1958 | Belden | 425/78 |
| 3,664,784 | 5/1972 | Sibley | 425/78 |
| 3,704,973 | 12/1972 | Renfrew et al. | 425/451.2 X |
| 3,924,986 | 12/1975 | Seiler | 425/451.2 |

Primary Examiner—J. Howard Flint, Jr.

[57] ABSTRACT

A mechanical press includes a plurality of cylinders to provide different fluid pressures to a lower mold against an upper mold to mold plastic parts. A pair of accumulators sequentially apply a low pressure to the cylinders for a predetermined time during the initial heating period and a high pressure for a predetermined time during the final molding period. A control valve controls the rate at which the high pressure is applied.

6 Claims, 6 Drawing Figures

MECHANICAL PRESS FOR MOLDING PLASTIC PARTS

With the extensive use of plastic parts, especially in the automotive industry, large mechanical presses for forming metal parts are to a great extent becoming absolete. Because of the high capital investments which have been made in such presses, industry has considered ways for converting such presses for use in molding plastic parts.

The wide variations in machine press sizes, the different characteristics of the plastics involved and the different time intervals required for plastic molding for different materials have made it difficult to arrive at a single solution for converting conventional mechanical presses to plastic molding presses. A mechanical press used for plastic molding is described in a patent to Hess U.S. Pat. No. 2,434,849, issued on Jan. 20, 1948. While providing a solution for a particular press for a particular application, the apparatus described in this patent does not have the flexibility and high speeds required in modern plastic molding machines.

It is an object of this invention to provide an improved means for utilizing a mechanical press for plastic molding.

It is a further object of this invention to provide improved means for converting mechanical presses of different sizes into presses for plastic molding.

It is a further object of this invention to provide an improved press for molding plastic parts in which the pressures applied may be readily varied for different types of plastic parts to be molded.

In accordance with the present invention, upper and lower molds in a press are adapted to hold a plastic piece to be formed therebetween and to be reciprocally moved with respect to each other to mold the plastic piece. The upper mold is maintained at a lowered position for a predetermined time period during the molding of the plastic piece before being returned to its upper position by conventional mechanical means. A first accumulator provides relatively low fluid pressure and a second accumulator provides relatively high pressure. A plurality of hydraulic cylinders support the lower mold and is connected to receive pressurized fluid from the first accumulator during the initial heating when the upper mold is lowered and during the initial heating operation. After the initial heating period, the cylinders receive relatively high pressure from the second accumulator to complete the molding operation. A control valve controls the rate of charging of the pressurized fluid from the second accumulator to the cylinders. First and second sequencers control the mechanical operation of upper mold and valves which control the applications of pressures from the accumulators.

Other objects and advantages of the present invention will be apparent and suggest themselves to those skilled in the art, from a reading of the following specification and claims, in conjunction with the accompanying drawings, in which:

Figure 1:
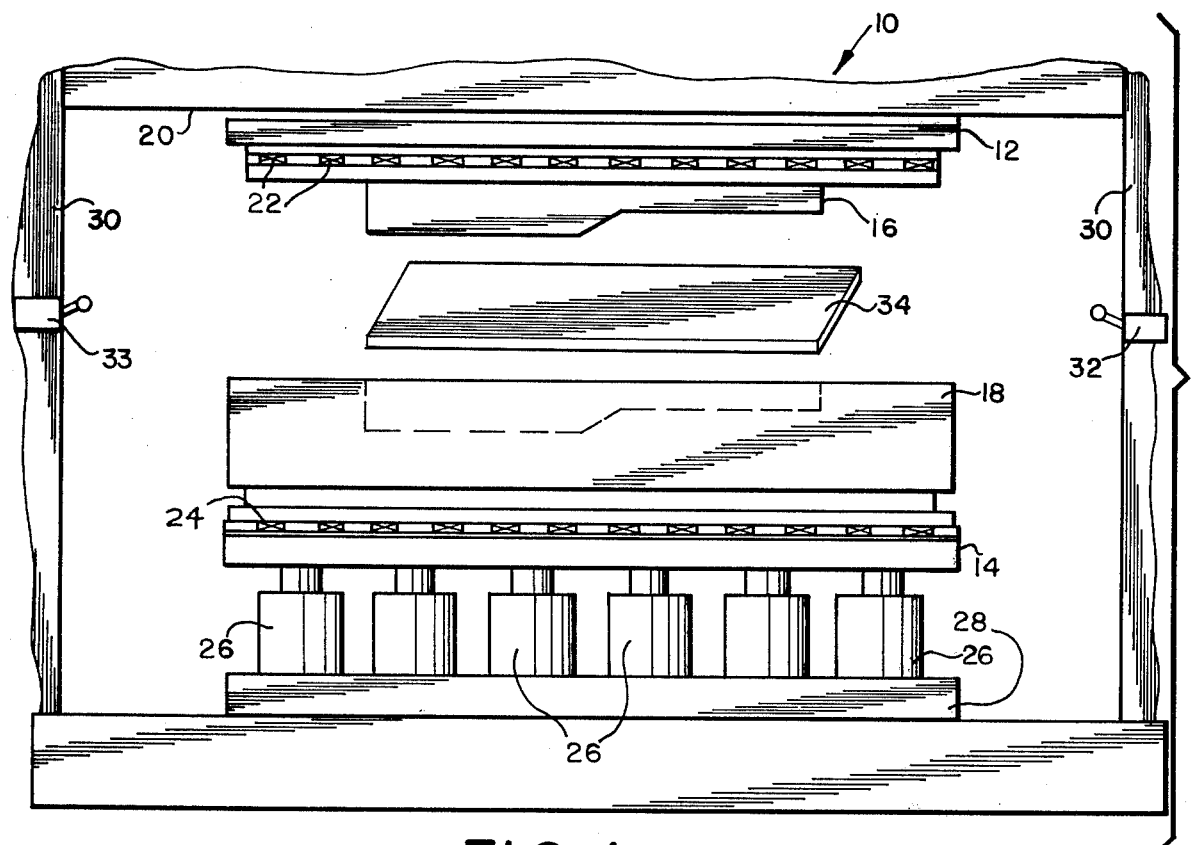
FIG. 1 is a front view of a mechanical press illustrating the present invention.
Figure 2:
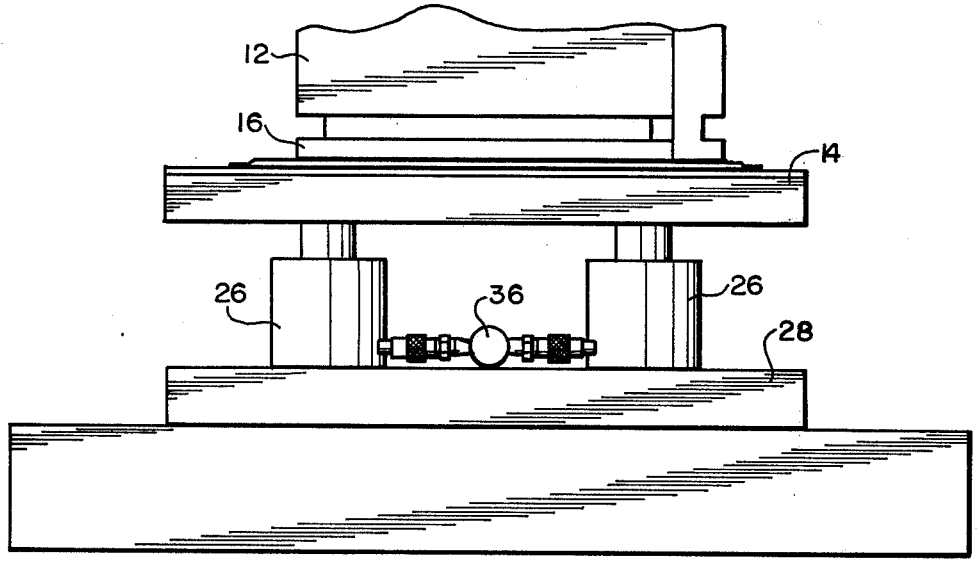
FIG. 2 is an end view of the bottom portion of the mechanical press illustrated in FIG. 1.
Figure 3:
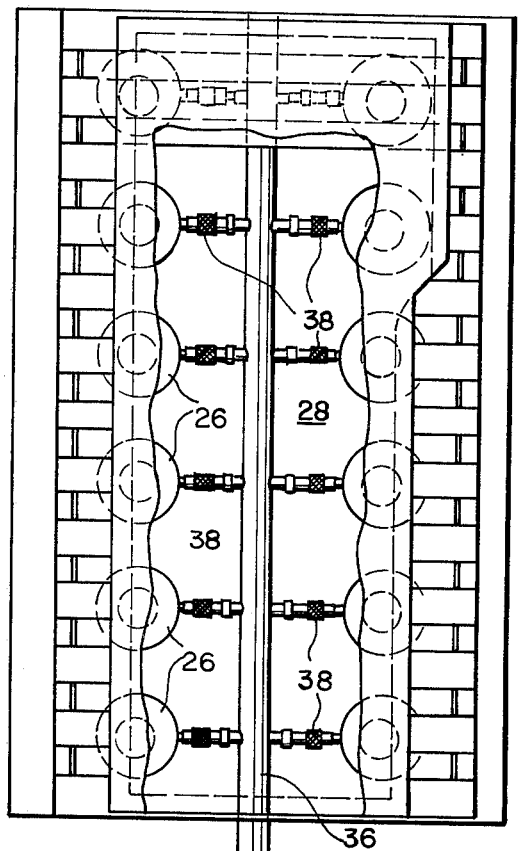
FIG. 3 is a top view, partly broken away of the press illustrated in FIG. 2.

Referring to FIGS. 1, 2 and 3, a mechanical press 10 comprises an upper platen 12 and a lower platen 14 disposed to be reciprocally moved with respect to each other. An upper mold 16 is connected to the upper platen 12 and a lower mold 18 is connected to the lower platen 14. The upper platen 12 is connected to a ram 20 which is adapted to be moved up and down in a manner well known to those skilled in the art. Heating elements 22 and 24 within the molds are disposed to heat the molds 16 and 18, respectively. A plastic piece 34, to be molded, may be placed between the molds for each cycle of operation.

The lower platen 14 is supported by a plurality of cylinders 26 which is connected to receive fluid under pressure, as will be described. The cylinders 26 are connected to a base member 28. The ram 20 is moved up and down within the press frame 30. During or before the operation of the ram 20, a sequencing switch 32, which may be a limit switch, for example, is actuated. When the sequencing switch 32 is closed, a sequencer (not illustrated) controls the operation of the press by lowering the upper ram 20, maintaining it in a down position for a predetermined time to perform the molding operation and then returning it to its upper position. The entire cycle is repeated for each plastic piece to be molded.

Sequencers, such as described, are well known to those skilled in the art. For example, multi-cam arrangements are commonly used in presses. The starting of the press, lowering and holding the upper platen in a down position for a predetermined time and then having the upper platen return to the upper position may all be controlled by the camming mechanisms which control various switches and brakes associated with the press. Various timing switches utilizing cam mechanisms are made by Industrial Timer, located in Parsippany, N.J. Also, the various types of clutches and brakes utilized in presses of the type involving the present invention is described in detail in a book entitled "Metal Workings Mechanical Press Handbook", published by Metal Workings Magazines, Boston, Mass., Copyright 1960. For example, positive and single operating clutches as used in presses of the general type used in connection with the present invention are described on page 34, et seq.

Operating of the ram 20 also actuates a sequencer switch 33 which starts a sequencer 54 (FIG. 4) which controls the molding times and pressures applied to plastic pieces to be molded by the molds 16 and 18. The sequencer 54, which may be started by the closing of a limit switch 33, will be described more fully in connection with FIG. 4. The lowering operation of the ram 20 actuates a limit switch 32 which commences the sequencer to control the mechanical operation of the press and the switch 33 which starts the sequencer 54 to control the time periods and the amounts of pressures applied to the cylinders 26.

When the plastic material 34 is inserted between the molds 16 and 18, the ram 20 is moved down to bring the upper mold 16 in close proximity to the lower mold 18 with the plastic material 34 therebetween to be formed to a desired shape.

As is well known in plastic molding, it is necessary to apply a predetermined pressure to the piece being formed while a certain temperature is applied prior to the final molding. This is known as the breathing period during which the plastic is softened and made ready for molding. When the upper mold 16 is first lowered toward the lower mold 18, with the plastic piece 34 therebetween, it is necessary that a cushioning effect at a relatively lower pressure be provided. The cushioning effect is provided by the lower platen 14 moving under the relatively low pressure from the cylinders 16. A degree of cushioning or movements of the lower platen is very small, in the order of an inch or less.

After relatively lower pressure is applied for a predetermined time, a relatively high pressure is then applied to the lower platen 14 from the cylinders 16 to raise the lower platen a short distance. The plastic material 34 is held in place for a predetermined length of time under a predetermined temperature to complete the final molding of the piece. At the end of the final molding time, the upper platen 12, with the mold 16, and ram 20 are raised. The formed piece is then removed with another charge of material to be molded, is inserted in its place and the cycle repeated.

It is noted that providing a plurality of cylinders for applying the pressures to the lower platen 14 offer a number of advantages. For example, the number of cylinders used may be designed to accommodate presses, molds and parts of different sizes. Also, the limits of the pressures involved may be controlled by controlling the sizes and number of the cylinders.

As illustrated in FIG. 3, high and low pressures are applied from a manifold 46, the operation of which will be described in connection with FIG. 4, to a conduit 36. The conduit 36 is connected to the plurality of connecting members 38 which are connected to the cylinders 28.

Figure 4:
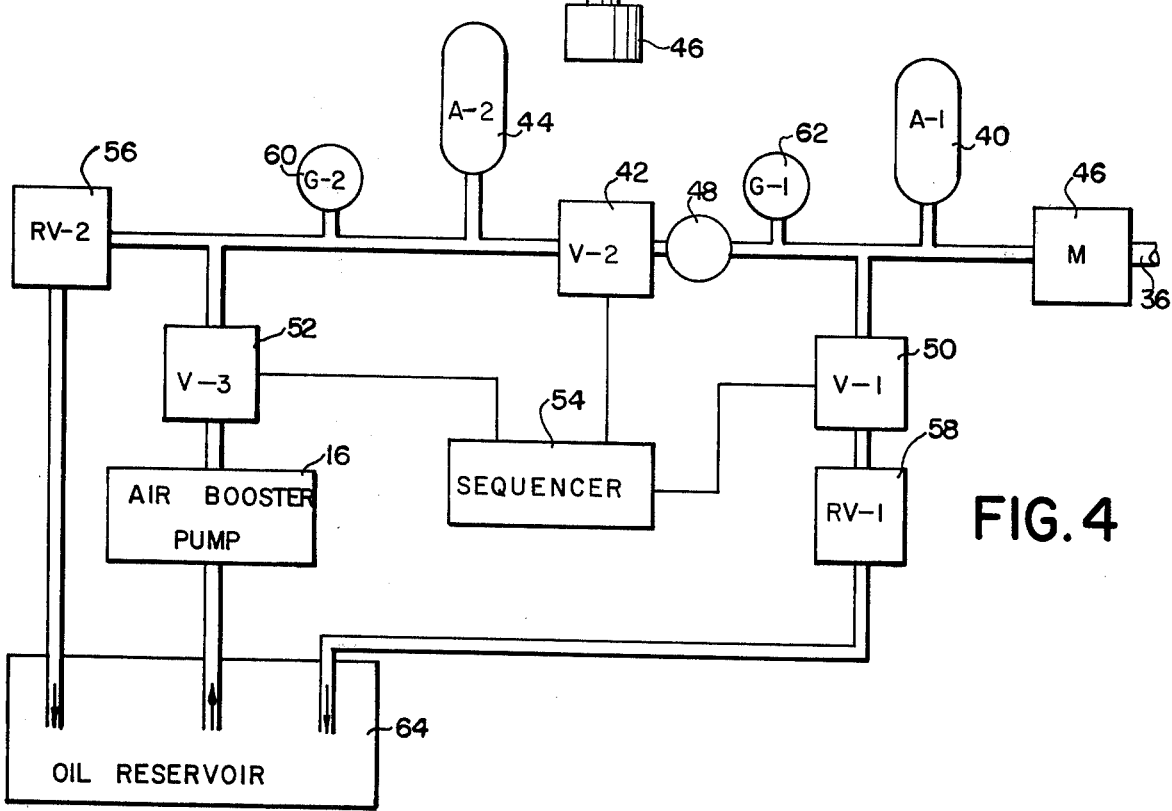
FIG. 4 is a block diagram illustrating the operation of the present invention.

Referring particularly to FIG. 4, in connection with the previous figures, the basic sequence of operation of the applications of the different fluid pressures are illustrated.

When the ram 20 is lowered, the mold 16 is moved down a relatively short distance toward the mold 18 with the piece 34 disposed therebetween. The "cushioning" effect is possible because the accumulators which apply the pressures include an inert gas as well as liquid. With all liquid, no cushioning would be practical. Heat is applied to the various heating elements 22 and 24 to heat the molds 16 and 18 to cause the material within the plastic piece 34 to flow. Pressure in an accumulator 40, also designated A-1, increases to an intermediate pressure.

After a predetermined time, a valve 42 is opened by the sequencer 54 to permit relatively high pressure from a second accumulator 44, also designated A-2, to be applied to the manifold 46 and consequently the cylinders by way of the conduits 36 and 38. When the relatively high pressure is applied from the accumulator 44 to the manifold 46 through the valve 42, it is important that the rate of flow be controlled so that pressure does not abruptly increase. This is necessary to permit the plastic piece 34 to expand slightly during the start of the final molding operation. If the high pressure is increased too suddenly, the plastic piece will tend to be damaged by cracking or irregular expansions. For this reason, a control valve 48 is included in the system and may be adjusted to control the rate of flow of pressure from the accumulator 44 into the manifold 46. The valve 42 is closed when the high pressure in the manifold 46 is reached.

The control valve 48 is controlled to vary the rate and also to vary the amount of pressure and rise time dependent upon the type of plastic material involved and the timing requirements of the molding operations. Upon completion of the molding operation, the valve 50 is opened to relieve the relatively high pressure from the manifold 46. The valve 50 closes after the high pressure is relieved.

At substantially the same time that the high pressure is being relieved from the manifold 46, the accumulator 44 is being recharged to a relatively high pressure. This is accomplished by the opening a valve 52 which recharges the accumulator 44 from an air powered pump 16, at which time the valve 52 closes. The ram 20 is retracted after the final molding period and the entire operation is repeated.

The sequencer 54 starts operating as a result of the closing of the limit switch 33 (FIG. 1), which is caused by the lowering of the ram 20. The opening and closing of the various valves 42, 50 and 52 are controlled by the sequencer which may include various cam elements which actuate switches to control the operation of the valves. Such sequencers are known and are not illustrated in detail since they may take various different forms and are only incidentally related to the present invention.

Safety valves 56 and 58 are included in the system in case of excess pressure which must be relieved. Pressure gauges 62 and 60 are provided in the system for measurements.

The fluid for the system is provided from an oil reservoir 64. A pump 66 is connected between the reservoir 64 and the valve 52 which controls the application of pressures to the accumulators 40 and 44.

Figure 5:
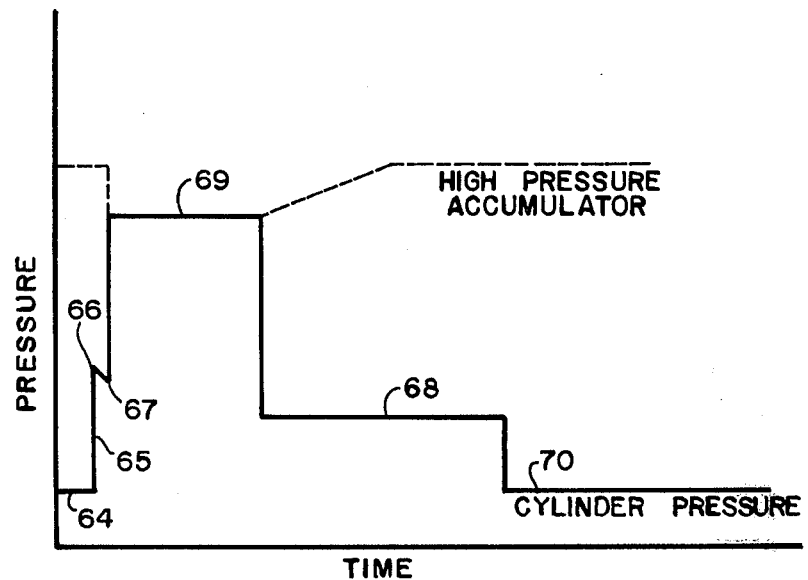
FIG. 5 is a chart illustrating the pressure applied to the press with respect to time.
Figure 6:
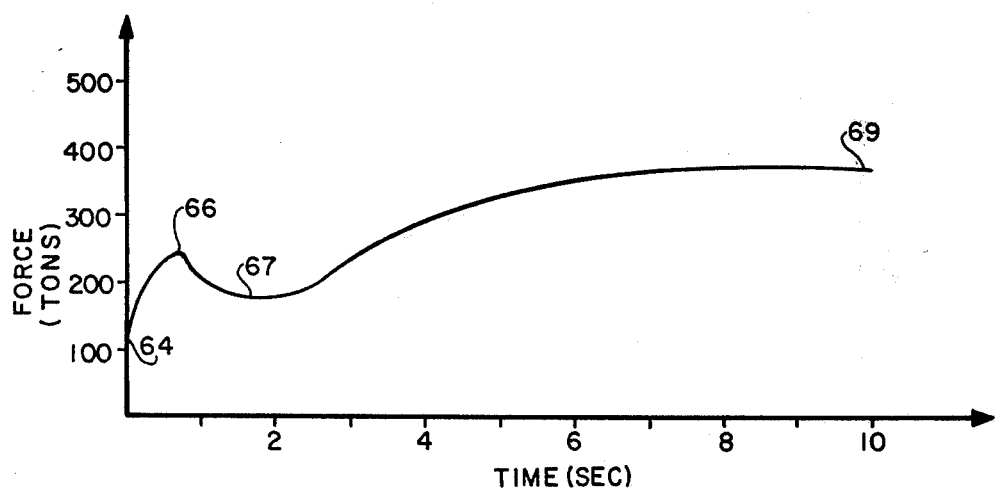
FIG. 6 is a chart similar to FIG. 5 with an expanded time base.

Referring to FIGS. 5 and 6, as well as to previous figures, various pressure levels and time durations of the pressures applied to the cylinders are illustrated. Dashed lines illustrate the pressures from the high pressure accumulator 44. The solid lines represent the pressure applied to the cylinders 26 when the ram 10 is in raised and lowered positions, under conditions where different pressures are applied to the cylinders 26 from the accumulators 40 and 44.

The pressure level with the ram 20 in the up position is represented by levels 64 and 70.

After the ram 20 is lowered, pressure from the low pressure accumulator 40 is applied to the cylinders 26 and rises as indicated by a vertical line 65 to the level or point 66. At this time, as a result of the melting and spreading reaction of the plastic piece 34 between the molds 16 and 18, the pressure at the cylinders lowers to a level 67. Pressure from the high pressure accumulator 44 is then applied to cause the pressure at the cylinders to rise to a level 69.

The high pressure level 69 is maintained for a predetermined period at which time the high pressure from the accumulator 44 is disconnected. The pressure at the cylinders 26 then drops to an intermediate pressure level as indicated by a lever 68. At this lever, the ram 20 is still in lowered position. Upon completion of the molding operation, the ram 20 rises and the pressure at the cylinders drops to a level 70.

The expanded time base diagram of FIG. 6 illustrates the rises in the cylinder pressures from the level 64 when the ram is up to level 66 when the ram is down. Finally the pressure drops to the level 67 with the ram still down. The high pressure accumulator 44 then causes the pressure level to rise from level 67 to level 69. The operation of the control valve 48, which controls the rise time of the high pressure from the accumulator 44 to the manifold 46 is illustrated in this figure. The rate of rise in the high pressure is controlled in accordance with the characteristics of the plastic pieces being molded, i.e., the type of material or thickness involved. The control valve 48 making different rise times possible makes it practical to use the same basic molding apparatus for different types of plastic material when different expansion and contraction rates and other characteristics are involved.

In a typical operation of the molding machine described, the descent and rise times of the ram may be about one second. The time that the ram is down is dependent upon the type of plastic material being molded. A typical dwell down time of the ram, for example, would be sixty seconds for each one-eighth inch thickness of the final molded product.

The low pressure at the cylinders before the ram is lowered is approximately one-twentieth the final molding pressure. The intermediate pressure when the ram is down prior to the application of the high pressure may be between one-tenth and one-quarter of the final molding pressure.

The temperature of the molds is dependent to some extent upon the materials to be molded. A typical valve would be around 200° F.

What is claimed is:

1. In a press,
   upper and lower platens having molds thereon disposed to be reciprocally moved with respect to each other to mold plastic material disposed therebetween,
   mechanical means including a first sequencer for lowering said upper platen and maintaining it at a lowered position during molding of said plastic material and returning it to its upper position after said molding operation,
   a source of liquid fluid,
   a first accumulator containing an inert gas for receiving said liquid fluid to provide relatively low fluid pressure,
   a second accumulator containing an inert gas for receiving said liquid fluid for providing relatively high pressure,
   means connecting said liquid fluid source to said first and second accumulators,
   a plurality of hydraulic cylinders for supporting said lower platen and connected to receive pressurized fluid from said first and second accumulators,
   a second sequencer for sequentially controlling the application of pressures and time durations thereof to said plurality of cylinders from said first and second accumulators during the molding of said plastic material, and
   an adjustable valve connected between said second accumulator and said cylinders to control the rise time of the pressure applied to said cylinders.

2. The invention as set forth in claim 1 wherein said second sequencer controls the operation of a first valve connected between said source of liquid fluid and said plurality of hydraulic cylinders, a second valve connected between said second accumulator and said adjustable valve, and a third valve connected between said source of liquid fluid and said second accumulator.

3. The invention as set forth in claim 2 wherein said second sequencer maintains said first and second valves in closed conditions with said first accumulator charged to provide energy absorption when said ram is lowered whereby with the ram and plastic material increasing the pressure from said first accumulator of said plurality of cylinders during the initial heating period of said plastic material.

4. The invention as set forth in claim 3 wherein said second sequencer causes said second valve to open when said first accumulator is charged while said first and third valves remain closed to permit high pressure from said second accumulator to be applied to said plurality of cylinders through said adjustable valve during the molding of said plastic material.

5. The invention as set forth in claim 4 wherein said second sequencer closes said second valve and opens said third and first valves to permit said second accumulator to recharge through said third valve and to relieve the high pressure from said plurality of cylinders through said first valve.

6. The invention as set forth in claim 5 wherein heating elements are provided for the molds included on said upper and lower platens.

* * * * *